United States Patent
Yang

(10) Patent No.: US 10,754,840 B2
(45) Date of Patent: Aug. 25, 2020

(54) CREATING INDEX IN BLOCKCHAIN-TYPE LEDGER

(71) Applicant: Alibaba Group Holding Limited, George Town (KY)

(72) Inventor: Xinying Yang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/807,237

(22) Filed: Mar. 3, 2020

(65) Prior Publication Data

US 2020/0201833 A1     Jun. 25, 2020

Related U.S. Application Data

(63) Continuation of application No. PCT/CN2020/071420, filed on Jan. 10, 2020.

(30) Foreign Application Priority Data

Jul. 29, 2019  (CN) .......................... 2019 1 0689278

(51) Int. Cl.
*G06F 17/00* (2019.01)
*G06F 16/22* (2019.01)
*G06Q 50/26* (2012.01)
*G06F 16/248* (2019.01)
*G06F 16/2455* (2019.01)
*G06F 16/23* (2019.01)

(52) U.S. Cl.
CPC ...... *G06F 16/2255* (2019.01); *G06F 16/2379* (2019.01); *G06F 16/248* (2019.01); *G06F 16/24558* (2019.01); *G06Q 50/265* (2013.01)

(58) Field of Classification Search
None
See application file for complete search history.

(56) References Cited

U.S. PATENT DOCUMENTS

| 9,009,206 B1 | 4/2015 | Jernigan, IV et al. |
| 2016/0342978 A1* | 11/2016 | Davis ................... G06Q 20/382 |
| 2017/0132621 A1* | 5/2017 | Miller .................. G06Q 20/065 |

(Continued)

FOREIGN PATENT DOCUMENTS

| CN | 107562775 | 1/2018 |
| CN | 108197505 | 6/2018 |

(Continued)

OTHER PUBLICATIONS

PCT International Search Report and Written Opinion in International Appln No. PCT/CN2020/071420, dated Apr. 26, 2020, 15 pages. (with partial English translation).

*Primary Examiner* — Hasanul Mobin
(74) *Attorney, Agent, or Firm* — Fish & Richardson P.C.

(57) ABSTRACT

A method and an apparatus for creating an index in a blockchain-type ledger, and a device are disclosed. According to solutions provided in implementations of the present specification, a service attribute of a data record written to a ledger and a storage location and a sequence number of the data record in the ledger are determined, a mapping relationship is established between the service attribute, the storage location, and the sequence number, and an inverted index with the service attribute as a primary key is created, facilitating subsequent query.

15 Claims, 4 Drawing Sheets

(56) References Cited

U.S. PATENT DOCUMENTS

| | | | |
|---|---|---|---|
| 2017/0237554 A1* | 8/2017 | Jacobs | G06Q 20/3825 |
| | | | 713/171 |
| 2017/0345011 A1* | 11/2017 | Salami | G06Q 20/10 |
| 2018/0139186 A1* | 5/2018 | Castagna | H04L 9/3242 |
| 2018/0198624 A1* | 7/2018 | Bisti | H04L 9/0891 |
| 2018/0285838 A1* | 10/2018 | Franaszek | G06Q 20/065 |
| 2018/0349621 A1* | 12/2018 | Schvey | G09C 1/00 |
| 2019/0043043 A1* | 2/2019 | Saraniecki | H04L 9/3239 |
| 2019/0132138 A1* | 5/2019 | Finlow-Bates | H04L 63/12 |
| 2019/0253240 A1* | 8/2019 | Treat | H04L 9/0637 |
| 2019/0332966 A1* | 10/2019 | Gidney | G06F 16/182 |
| 2020/0013050 A1* | 1/2020 | Finlow-Bates | G06Q 20/382 |

FOREIGN PATENT DOCUMENTS

| | | |
|---|---|---|
| CN | 108876615 | 11/2018 |
| CN | 109873866 | 6/2019 |
| CN | 109900207 | 6/2019 |

\* cited by examiner

| Field name | Field type | Field description |
|---|---|---|
| Hash | h256 | Hash value of a data block |
| Version | Uint32_t | Version number |
| Number | Uint64_t | Block height |
| Parent_hash | h256 | Hash value of a parent data block |
| Tx_root | h256 | Root hash of a Merkle tree of data in a block body |
| Time_stamp | Uint64_t | Timestamp |
| Clue | String | Service attribute |
| Length | Uint64_t | Valid length |
| SEQ | Uint64_t | Sequence number |

FIG. 3

CREATING INDEX IN BLOCKCHAIN-TYPE LEDGER

CROSS-REFERENCE TO RELATED APPLICATIONS

This application is a continuation of PCT Application No. PCT/CN2020/071420, filed on Jan. 10, 2020, which claims priority to Chinese Patent Application No. 201910689278.7, filed on Jul. 29, 2019, and each application is hereby incorporated by reference in its entirety.

TECHNICAL FIELD

Implementations of the present specification relate to the field of information technologies, and in particular, to the methods, apparatuses, and devices for creating an index in a blockchain-type ledger that stores data based on a blockchain data structure (e.g., in a form of a blockchain).

BACKGROUND

When a centralized database server provides services to the outside by using a blockchain-type ledger, the ledger records relevant data records that related users need to store.

In practice, the centralized database server usually serves enterprise users. The enterprise users need to store data records related to different service attributes, e.g., sources of the data records, and users of the data records, and projects that the data records belong to, etc. Data records related to the same service attribute are usually stored in a scattered and disordered manner in the blockchain-type ledger. Therefore, it is inconvenient to perform status statistics analysis and query on the data records related to the same service attribute.

Based on this, a solution for creating an index related to a service attribute of a data record is needed for flexible data query.

SUMMARY

An implementation of the present application aims to provide a method for creating an index in a blockchain-type ledger for flexible data query.

To solve the previous technical problem, the implementation of the present application is implemented as follows:

A method for creating an index in a blockchain-type ledger is disclosed. The method is applied to a centralized database server that stores data by using a blockchain-type ledger, and includes: obtaining a service attribute and a sequence number that are included in a data record; determining location information of the data record in a ledger, where the location information includes a block height of a data block including the data record, and an offset of the data record in the data block; establishing a mapping relationship between the service attribute, the location information, and the sequence number; and, based on the sequence number, sequentially writing the mapping relationship to an index that uses the service attribute as a primary key, where in the blockchain-type ledger, each data block other than an initial data block includes at least one data record and a hash value of the data block itself that is determined based on a hash value of a previous data block and a data record included in the data block itself, and the block heights of data blocks increase monotonically based on a sequence of block forming time.

Correspondingly, an implementation of the present specification further provides an apparatus for creating an index in a blockchain-type ledger. The apparatus is applied to a centralized database server that stores data by using a blockchain-type ledger, and includes: an acquisition module, configured to obtain a service attribute and a sequence number that are included in a data record; a determining module, configured to determine location information of the data record in a ledger, where the location information includes a block height of a data block including the data record, and an offset of the data record in the data block; and a writing module, configured to establish a mapping relationship between the service attribute, the location information, and the sequence number, and, based on the sequence number, sequentially write the mapping relationship to an index that uses the service attribute as a primary key, where in the blockchain-type ledger, each data block other than an initial data block includes at least one data record and a hash value of the data block itself that is determined based on a hash value of a previous data block and a data record included in the data block itself, and the block heights of data blocks increase monotonically based on a sequence of block forming time.

According to the solutions provided in the implementations of the present specification, the service attribute of the data record written to the ledger and the storage location and sequence number of the data record in the ledger are determined, the mapping relationship is established between the service attribute, the storage location, and the sequence number, and an inverted index that uses the service attribute as the primary key is created. As such, statistics analysis can be sequentially performed on data records based on the service attribute in the index without the need to know the user's service details, facilitating subsequent query and verification.

It should be understood that the general descriptions above and the following detailed descriptions are examples and explanations, and are not intended to limit the implementations of the present specification.

In addition, an implementation of the present specification does not need to achieve all the effects above.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

FIG. 3 is a schematic diagram illustrating a block header of a data block, according to an implementation of the present specification;

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

In current scenarios, data records related to the same service attribute may be stored in a scattered and disordered manner in the blockchain-type ledger making it inconvenient to perform status statistics analysis and query on the data records related to the same service attribute. The present specification offers a process for creating an index related to a service attribute of a data record to enable flexible data query.

Figure 1:
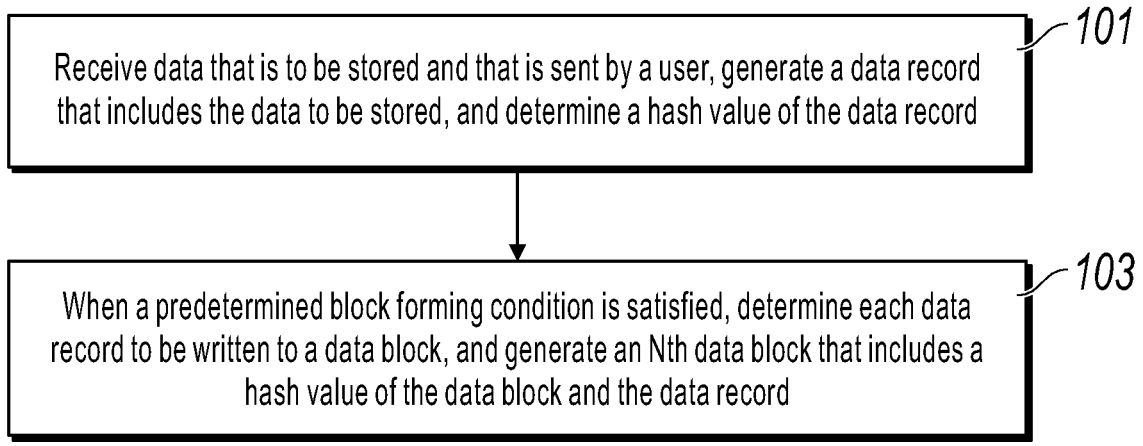
FIG. 1 is a schematic flowchart illustrating blockchain-type ledger generation, according to an implementation of the present specification.

First, a centralized blockchain-type ledger related to the implementations of the present specification is described. The blockchain-type ledger stores data based on a blockchain data structure (e.g., in a form of a blockchain). On a centralized database server, a blockchain-type ledger is generated by using the following method. FIG. 1 is a schematic flowchart illustrating blockchain-type ledger generation, according to an implementation of the present specification, including the following steps.

S101. Receive data that is to be stored and that is sent by a user, generate a data record that includes the data to be stored, and determine a hash value of the data record, where the data record includes a service attribute and a sequence number.

The data to be stored here can be various consumption records of an individual client user, or can be a service result, an intermediate state, an operation record, etc. generated when an application server executes service logic based on an instruction of the user. Specific service scenarios can include a consumption record, an audit log, a supply chain, a government supervision record, and a medical record, etc.

The database server needs to generate, based on the data to be stored, the data record to be written to a ledger. The data record includes the service attribute and the sequence number.

The service attribute represents a service characteristic of the data record, and can include a user name, a user identity card number, an institution name, a transaction type, a data record type, etc. For example, in a data record that includes a report and that is uploaded by a financial institution, the service attribute can be a report number "G01" that represents the type of the report, that is, a balance sheet. Or the service attribute can be a serial number of a project that the report belongs to, etc.

In an implementation, when creating a ledger, a user can determine a method for obtaining a service attribute and a sequence number in the ledger.

For example, the user can create the ledger by using a creation instruction, where the creation instruction includes a data structure configuration parameter of the ledger. In this case, the database server can obtain the configuration parameter of the ledger from the instruction, write the configuration parameter to the header of an initial data block in the created ledger, generate a data record including the creation instruction, and write the data record to the body of the initial data block. Query can be performed from the initial data block at any time to determine how the user creates the ledger.

For another example, when creating the ledger, the user can further generate a data structure parameter configuration file for the ledger. A parameter value in the data structure parameter configuration file is a parameter value in the creation instruction. The data structure parameter configuration file is used to configure a type of a configuration parameter of the ledger and a specific value of each parameter. In other words, after initially setting a parameter value, the user can change the configuration parameter by modifying the configuration file. Data structure configuration parameters can include a service attribute parameter and a sequence number parameter.

For example, the user can initiate the instruction CreateLedger(LedgerID, CLUE: ID) to the database server, where "LedgerID" is the identifier (ID) of the ledger, and "CLUE: ID" indicates that the service attribute of the ledger is set as a user ID. Or the user can initiate the instruction CreateLedger(LedgerID, CLUE: G01) to the database server, where "CLUE: G01" represents that the value of the service attribute of the ledger is changed to "G01".

In the previous examples, it is assumed that both user A and user B define IDs as service attributes of their respective ledgers. If the ID of user A is "UID2019", for user A, a string corresponding to the service attribute is "UID2019". If the ID of user B is "UID2020", for user B, a string corresponding to the service attribute is "UID2020".

The sequence number represents a sequential relationship between data records that include the same service attribute in the ledger. The sequence number can be determined by the user and written to the data that is to be stored and that is uploaded by the user, or can be determined by the database server and written to the data that is to be stored and that is uploaded by the user.

For example, the user can change the value of the sequence number parameter in the configuration parameters by using an instruction. For example, when creating the ledger, the user enters the instruction CreateLedger(LedgerID, CLUE, NULL) to set the value of the sequence number parameter to "NULL", which indicates that no sequence number is needed. Or the user enters the instruction CreateLedger(LedgerID, CLUE, SEQ-NUM), which indicates that a sequence number specified by the user is obtained from a data record to be stored. Or the user enters the instruction CreateLedger(LedgerID, CLUE, SEQ-TIME), which indicates that the database server determines the sequence number based on the time point at which the data is received. Certainly, in the solution provided in the present implementation of the present specification, the data rerecord to be stored needs the sequence number.

For any piece of data to be stored, the sequence number can be obtained by using any one of the following two methods.

In a first method, the user specifies the sequence number. To be specific, the user adds the corresponding sequence number when sending the data to be stored. In this method, the database server and the user need to agree on a data format so that the database server can obtain the corresponding sequence number from the data to be stored.

In a second method, the database server determines the sequence number. To be specific, the database server assigns, based on a timestamp of a received data record to be stored, a sequence number in the ledger to the data record to be stored. It is easy to understand that the sequence numbers that respectively maintained by each ledger are independent of each other. A corresponding sequence can be accurately assigned to each data record by using this method when the user sends, with low frequency, data to be stored.

For example, for data uploaded by the same user in the same ledger, the sequence number corresponding to the service attribute "ID" may be "100". If the service attribute is "G01", the sequence number may be "50". For each service attribute, the sequence number 1 can be assigned in the initial data block, and the sequence number is increased by 1 each time a value of the same service attribute is written. Because a service-related sequential relationship between data records stored in a data block is actually invisible, a sequential relationship between the data records in the ledger can be determined by assigning sequence numbers to the data records. It facilitates subsequent query and verification by the user.

Figure 2:
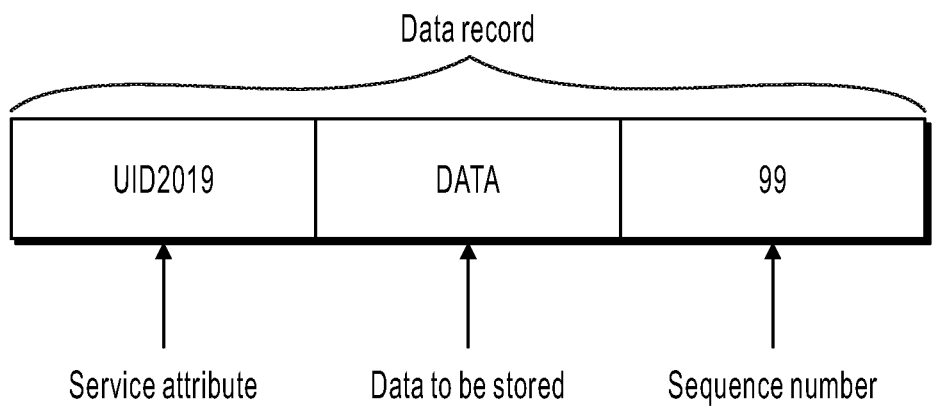
FIG. 2 is a schematic diagram illustrating a logical structure of a data record, according to an implementation of the present specification.

Further, the database server can concatenate the data to be stored, the sequence number, and the service attribute to generate the data record that includes the data to be stored, determine the hash value of the data record, and return the hash value to the user. FIG. 2 is a schematic diagram illustrating a logical structure of a data record, according to an implementation of the present specification.

The service attribute and the sequence number can be placed in the header or the tail of the data to be stored. In addition, special identification characters can be used to identify the service attribute and the sequence number. For example, "OE" is used as a start identification character, and "OF" is used as an end identification character. Alternatively, specified occupied space can be allocated to the header and the tail to distinguish between the header of the data record, the tail of the data record, and the data that is to be stored and that is included in the data record.

For example, if data that is to be stored and that is uploaded by user A is "DATA", and the sequence number of the data is 99, the data record that is obtained through concatenation and that includes the service attribute is "UID2019DAT99". Alternatively, when the identification characters exist, the generated data record is "OEUID2019OFDATAOE99OF".

For another example, when the space occupied by the header and the tail is specified, the data record can be [UID2019][DATA][99], where "[UID2019]" and "[99]" each occupy space of a specified length, and an insufficient part can be completed by using invalid characters. In this method, the header, the data, and the tail can be efficiently identified. As such, the service attribute, the data, and the sequence number included in the data record can be conveniently identified.

S103. When a predetermined block forming condition is satisfied, determine each data record to be written to a data block, and generate an Nth data block that includes a hash value of the data block and the data record.

The predetermined block forming condition includes the following: a quantity of data records to be stored reaches a quantity threshold, for example, a new data block is generated each time when one thousand data records are received, and the one thousand data records are written to the block; or a time interval from a previous block forming time reaches a time threshold, for example, a new data block is generated every five minutes, and data records received within these five minutes are written to the block.

Here, N indicates the sequence number of the data block. In other words, in the present implementation of the present specification, data blocks are arranged in the form of a chain of blocks based on a sequence of block forming times, and have a strong time sequence characteristic. The block heights of the data blocks increase monotonically based on the sequence of block forming time. The block height can be a sequence number. In this case, the block height of the Nth data block is N. The block height can be alternatively generated by using another method.

When N=1, the data block is the initial data block. The hash value and block height of the initial data block are given based on a predetermined method. For example, the initial data block includes no data record, the hash value of the initial data block is any given hash value, and the block height blknum=0. For another example, a trigger condition for generating the initial data block is consistent with a trigger condition for generating other data blocks, but the hash value of the initial data block is determined by hashing content in the initial data block.

When N>1, since content and a hash value of a previous data block are determined, the hash value of the current data block (that is, the Nth data block) can be generated based on the hash value of the previous data block (that is, the (N−1)th data block). For example, a feasible method is as follows: determine the hash value of each data record to be written to the Nth data block; generate a Merkle tree based on the sequence of data records in the data block; concatenate a root hash value of the Merkle tree and the hash value of the previous data block; and generate the hash value of the current data block by using the hash algorithm. For another example, concatenation and hashing can be performed based on the sequence of data records in the data block to obtain a hash value of the overall data record. The hash value of the previous data block and the hash value of the overall data record are concatenated to obtain a string. A hash operation is performed on the obtained string to generate the hash value of the data block.

The data block generated by using the previous methods can include a block header and a block body. The block body can be configured to store a plaintext of the data record, the hash value of the data record, etc. The block header can be configured to store metadata about the data block, for example, a version number of the ledger, the hash value of the previous data block, the root hash value of the Merkle tree including the data records in the data block, the hash value of the current data block, and a status array used to record an operated state of the data record.

For example, data structure configuration parameters can be written to the block header in the initial data block. FIG. 3 is a schematic diagram illustrating a block header of a data block, according to an implementation of the present specification. In the initial data block, Parent_hash (the hash value of the previous data block) can be empty. The initial data block can further include data structure configuration parameters such as CLUE, LENGTH, and SEQ. In practice, each field has an actual value (for example, a specific value of Parent_hash is a string containing 256 characters, a specific value of CLUE is "ID", and a specific value of SEQ is "SEQ_TIME"). The specific values are not shown in the schematic diagram.

After successfully uploading the data, the user can obtain the hash value of the corresponding data record and the hash value of the data block that includes the data record, store the hash values, and initiate integrity verification based on the hash values. A specific verification method is recalculating, in a database, the hash value of the data record and the hash value of the data block that includes the data record, and comparing the hash values with hash values stored locally.

According to the data block generation methods above, each data block is determined based on a hash value. The hash value of the data block is determined by the content and sequence of data records in the data block and the hash value of the previous data block. The user can initiate verification based on the hash value of the data block at any time. A modification to any content in the data block (including a modification to the content or sequence of data records in the data block) can lead to inconsistency between the hash value of the data block calculated during the verification and the hash value obtained when the data block is generated. The inconsistency causes the verification to fail. As such, the data records are both centralized and tamperproof.

Verification on a blockchain-type ledger usually means continuous integrity verification on a specified range of data blocks or continuous integrity verification starting from the initial data block. The verification is performed as follows: obtain the hash value of the previous data block; and recalculate the hash value of the data block based on the data record in the data block and the hash value of the previous data block by using the algorithm that is used for generating the hash value of the data block.

Figure 4:
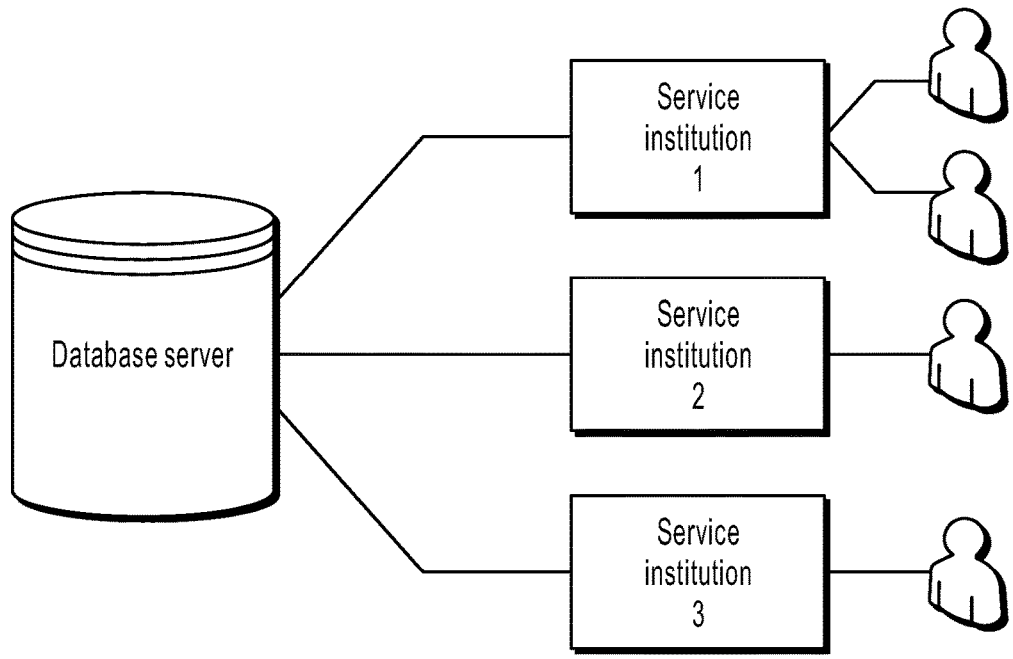
FIG. 4 is a schematic diagram of a system architecture related to implementations of the present specification.

The previous part describes the blockchain-type ledger related to the implementations of the present specification. In practice, the database server usually serves various institutions. Each institution can store, on the database server, data records generated between the institution and a third party (including another institution or an individual). FIG. 4 is a schematic diagram of a system architecture related to implementations of the present specification. In the schematic diagram, one enterprise institution can serve a plurality of users. Each user can perform query from the database server through a corresponding enterprise institution.

For example, the database server serves a certain financial product company, and the data record can be a financial record of an individual user of the financial product company. Or the database server serves a government department, and the data record is an overhead detail of a public project managed by the department. Or the database server serves a certain hospital, and the data record is a medical record of a patient. Or the database server serves a third-party payment institution, and the data record can be a record of payment performed by an individual user through the institution, etc.

As described previously, although these data records already have a strong time sequence characteristic when they are written to the ledger, for a user, the data records are usually distributed and stored in a plurality of data blocks.

For example, the hospital uploads medical records of patients in a sequence of generation time. A certain user of the hospital may have a plurality of medical records generated at long intervals. If the hospital or the user needs to select the user's data records from the ledger, the hospital or the user needs to perform query from the ledger based on the hash values of the medical records that are determined when the medical records are stored, which is inconvenient and cannot reflect a sequential relationship between the medical records. A lack of a time sequential relationship between the user's medical records obtained through the query can lead to poor user experience.

Based on this, the implementations of the present specification provide a method for creating an index of a data record. The method is applied to a centralized database server that stores data by using a blockchain-type ledger. According to the method, when it is unnecessary to know service details of a served institution, an inverted index by using the service attribute as a primary key is created to facilitate service processing of the served institution and improve user experience.

Figure 5:
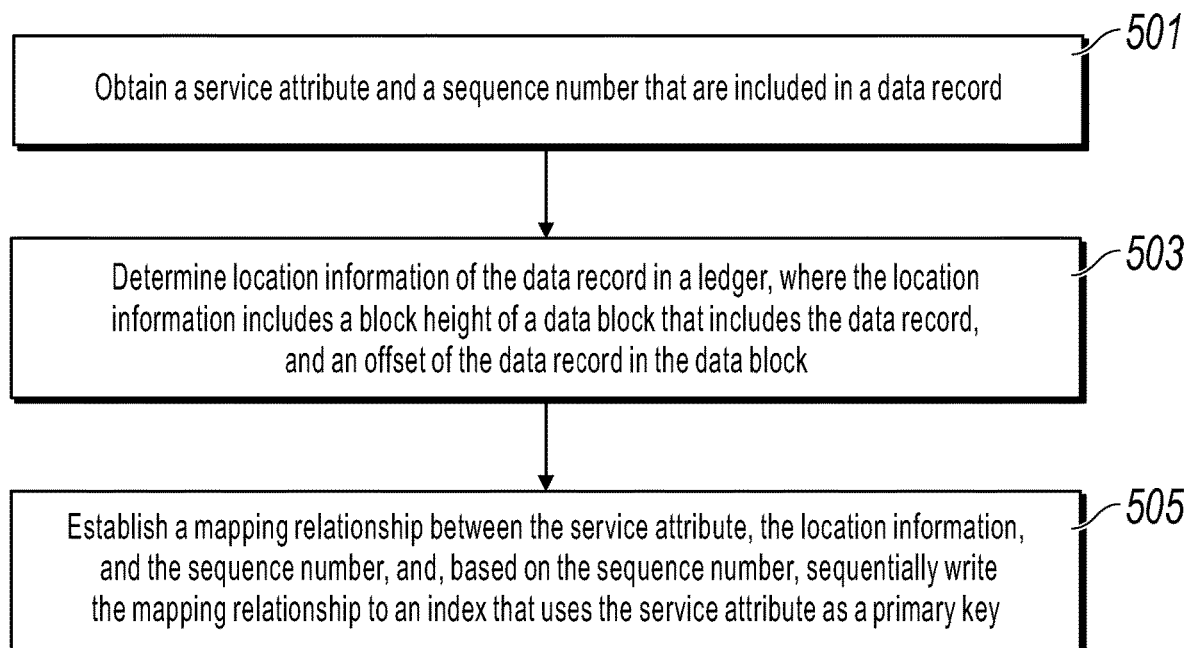
FIG. 5 is a schematic flowchart illustrating a method for creating an index in a blockchain-type ledger, according to an implementation of the present specification.

The technical solutions provided in the implementations of the present specification are described in detail below with reference to the accompanying drawings. FIG. 5 is a schematic flowchart illustrating a method for creating an index in a blockchain-type ledger, according to an implementation of the present specification. The method includes the following steps.

S501. Obtain a service attribute and a sequence number that are included in a data record.

As described previously, a data structure of the data record is determined based on a data structure configuration parameter. Therefore, a database server can obtain the service attribute and the sequence number that are included in the data record by parsing the configuration parameter of the ledger.

For example, when the service attribute and the sequence number are identified by using identification characters in the data record "OEUID2019OFDATAOE99OF", it can be obtained based on the identification characters "OE" and "OF" that the service attribute is "UID2019", and the sequence number is "99".

For another example, if occupied space is specified, segment parsing of the occupied space can be directly performed on the data record [UID2019][DATA][99] to directly read the service attribute and the sequence number.

S503. Determine location information of the data record in the ledger, where the location information includes a block height of a data block that includes the data record, and an offset of the data record in the data block.

As described previously, one blockchain-type ledger includes a plurality of data blocks, and one data block usually includes a plurality of data records. Therefore, in the present implementation of the present specification, the location information refers to a data block that includes a stored data record in the ledger and the location of the data record in the data block.

In the data block provided in the present implementation of the present specification, different data blocks can be identified by using different methods, including hash values or block heights of the data blocks.

A hash value of a data block is obtained by performing a hash operation based on a hash value of a previous data block and a data record in the data block, and can be used to uniquely and definitely identify the data block. In the blockchain-type ledger, a block height of a first data block is usually 0, and the block height is increased by 1 each time a data block is added. Alternatively, block forming time of data blocks can be converted to a long sequence of integer data (usually including 12 to 15 bits) that increases monotonically, and the sequence can be used as block heights of the data blocks. Therefore, a data block usually has a definite block height.

For another example, the sequence of data records is fixed in a determined data block to be written to a database. Therefore, a data record has a definite offset number in the data block. When the length of the data record is a fixed unit, the offset number can also be used to determine the location information of the data record in the data block. That is, the offset number can also be used to indicate the offset.

In addition, because one data block usually includes a plurality of data records, the data records in the data block can be identified by using address offsets of the data records in the data block. Clearly, data records in the same data block have different address offsets.

Certainly, in the methods provided in the present implementation of the present specification, a specific format of the data block can be customized (for example, metadata information and remark information included in the header of the data block, and a form of the block height of the data block). Content of the location information varies with the format, which does not constitute a limitation on the present solution.

S505. Establish a mapping relationship between the service attribute, the location information, and the sequence number, and, based on the sequence number, sequentially write the mapping relationship to an index that uses the service attribute as a primary key.

That is, the index is an inverted index. In the index, the primary key is the service attribute included in the data record. A specific writing method is as follows: create an index record using the service attribute as a primary key in an index table when the primary key in the index does not include the service attribute; or write the location information and the sequence number to an index record including the service attribute when the primary key in the index includes the service attribute.

Table 1 is an example index table according to an implementation of the present specification. A key is a specific value of the service attribute. Each array in the Value column indicates a piece of location information and a sequence number. An array in the Value column includes three parts: a first part is a block height of a data block including a data record, the second part is an offset number of the data record in the data block, and the third part is a sequence number assigned to the data record based on the service attribute. The data record can be uniquely determined based on the block height and the offset number. It is easy to understand that one key can correspond to a plurality of pieces of location information in the index table. For example, in the array (2,8,1), "2" is a block height, "8" is an offset number, and "1" is a sequence number under the service attribute "0X123456".

TABLE 1

| Key | Value |
| --- | --- |
| 0X123456 | (2,8,1), (2,10,2), (300,89,3), (300,999,4) |
| 344X0001 | (5,01,1), (8,22,2) |
| . . . | . . . |

In the index table, one service attribute can correspond to a plurality of pieces of location information and a plurality of sequence numbers (that is, correspond to a plurality of data records). Therefore, when the location information is being written to the index, the location information and the sequence numbers can be further sorted based on the sequence numbers, facilitating query and verification performed by a user. The sequence of data records in the ledger reflects the time when the data records are written to the ledger, or reflects determining of the sequence of the data records by the user.

According to the solutions provided in the present implementation of the present specification, the service attribute of the data record written to the ledger and the storage location and sequence number of the data record in the ledger are determined, the mapping relationship is established between the service attribute, the storage location, and the sequence number, and an inverted index by using the service attribute as the primary key is created. As such, statistics analysis can be sequentially performed on data records based on the service attribute in the index without the need to know the user's service details, facilitating subsequent query and verification.

After the index table is created, status query and statistics analysis can be performed on the service attribute based on the index table. For example, a query request including a specific value of the service attribute is received (the query request is usually sent in a form of an instruction). The query request can be sent by a served institution or a user served by the institution. In this case, the database can perform matching in the index table based on the specific value of the service attribute. For example, after Table 1 is created, the user can obtain location information (2,8,1), (2,10,2), (300, 89,3), and (300,999,4) of data records corresponding to the user "0X123456" from the index table by entering the query instruction Retrieve (0X123456, &v, FULL). Further, the corresponding data records can be obtained through query based on the location information (2,8), (2,10), (300,89), and (300,999). In addition, the data records corresponding to (2,8), (2,10), (300,89), and (300,999) are sequentially returned to the user based on the sequence numbers. Alternatively, the data records obtained through the query can be sorted on the database server based on the sequence numbers. As such, a plurality of sorted data records can be returned to the user.

Further, a block height parameter for specifying a data block range can be included during the query. For example, the user enters the query instruction, Retrieve (0X123456, &v, 100) to query data records of the specified user 0X123456 prior to a data block at the height of 100. In this case, data records corresponding to (2,8) and (2,10) are obtained and returned sequentially.

A range of data blocks can be alternatively determined by two data block heights. For example, the user enters the instruction Retrieve (0X123456, &v, 200, 1000) to query data records of the user 0X123456 from the block height 200 to the block height 1000 in the ledger. As such, data records corresponding to the location information (300,89,3) and (300,999,4) are obtained and returned sequentially.

After the index is created, the user can perform statistics analysis on the data records directly based on the index table. For example, the served institution wants to count the quantity of each user's data records, or the users want to know their data records related to the served institution. In this case, it is sufficient to directly count the quantity of arrays in the Value column following each key value in the index table. Statistics analysis can be sequentially performed on the data records based on the service attribute and the index, facilitating subsequent query and verification.

Figure 6:
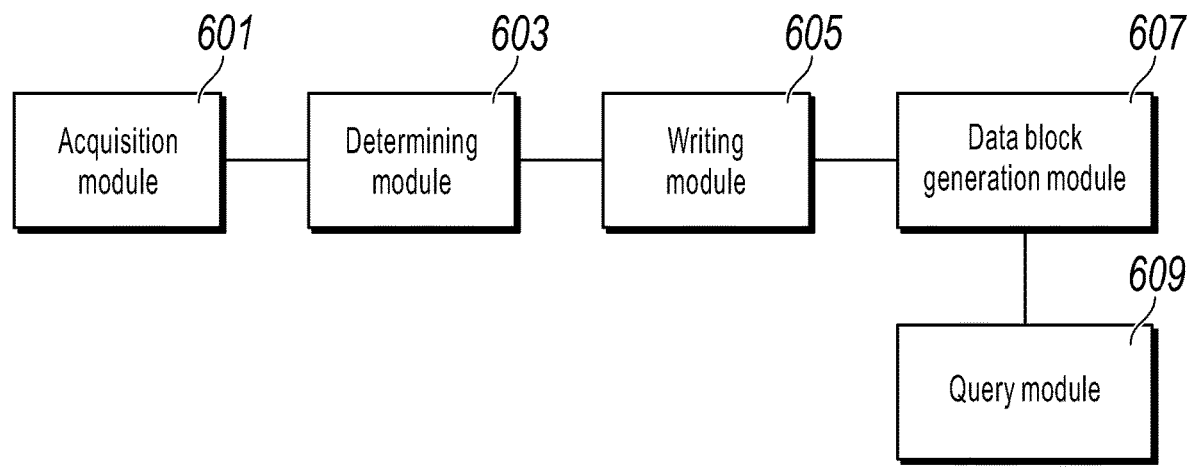
FIG. 6 is a schematic structural diagram illustrating an apparatus for creating an index in a blockchain-type ledger, according to an implementation of the present specification.

Correspondingly, an implementation of the present specification further provides an apparatus for creating an index in a blockchain-type ledger. FIG. 6 is a schematic structural diagram illustrating an apparatus for creating an index in a blockchain-type ledger, according to an implementation of the present specification. The apparatus includes: an acquisition module 601, configured to obtain a service attribute and a sequence number that are included in a data record; a determining module 603, configured to determine location information of the data record in a ledger, where the location information includes a block height of a data block including the data record, and an offset of the data record in the data block; and a writing module 605, configured to establish a mapping relationship between the service attribute, the location information, and the sequence number, and, based on the sequence number, sequentially write the mapping relationship to an index that uses the service attribute as a primary key.

In the blockchain-type ledger, each data block other than the initial data block includes at least one data record and a hash value of the data block itself that is determined based on a hash value of a previous data block and a data record included in the data block itself, and the block heights of data blocks increase monotonically based on a sequence of block forming time.

The acquisition module 601 is further configured to obtain, when receiving a data record sent by a user, a service attribute and a sequence number that are included in a specified identification filed in the data record; or determine a data record included in a data block in the ledger, and obtain a service attribute and a sequence number that are included in a specified identification field in any data record included in the data block.

The writing module 603 is further configured to create an index record using the service attribute as a primary key in the index table when the primary key in the index does not include the service attribute; or write the location information and the sequence number to an index record including the service attribute when the primary key in the index includes the service attribute.

The apparatus further includes a data block generation module 607, configured to receive data that is to be stored and that is sent by a user, generate a data record including the data to be stored, and determine a hash value of the data record, where the data record includes a service attribute and a sequence number; and when a predetermined block forming condition is satisfied, determine each data record to be written to a data block, and generate an Nth data block that includes a hash value of the data block and the data record, including: when N=1, giving a hash value and block height of the initial data block based on a predetermined method; or when N>1, determining the hash value of the Nth data block based on each data record to be written to the data block and a hash value of an (N−1)th data block, and generating the Nth data block that includes the hash value of the Nth data block and the data record, where the block heights of the data blocks increase monotonically based on the sequence of block forming time.

Further, the predetermined block forming condition includes the following: a quantity of data records to be stored reaches a quantity threshold; or a time interval from a previous block forming time reaches a time threshold.

The apparatus further includes a query module 609, configured to receive a query instruction that includes a specific value of the service attribute, perform matching in an index table based on the specific value of the service attribute of the user to determine location information and sequence numbers that correspond to the specific value of the service attribute in the index table; and obtain corresponding data records from the ledger based on the location information, and sequentially return the obtained corresponding data records to a query instruction sender based on the sequence numbers.

An implementation of the present specification further provides a computer device. The computer device includes at least a memory, a processor, and a computer program that is stored in the memory and that can run on the processor. When the processor executes the program, the method for creating an index in a blockchain-type ledger shown in FIG. 5 is implemented.

Figure 7:
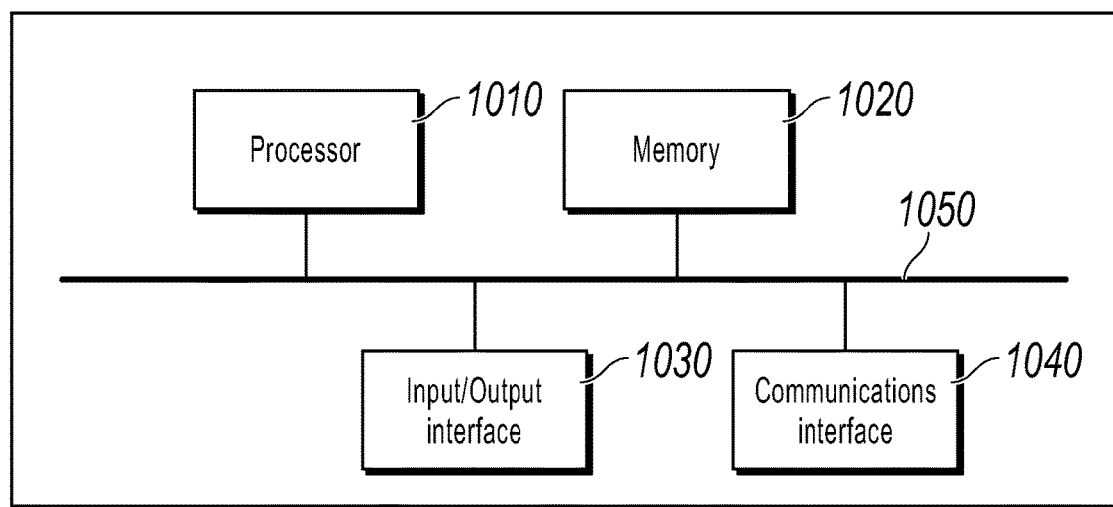
FIG. 7 is a schematic structural diagram illustrating a device for configuring methods in implementations of the present specification.

FIG. 7 is a schematic diagram illustrating a more detailed hardware structure of a computing device, according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected in the device through the bus 1050.

The processor 1010 can be implemented in a form of a general-purpose central processing unit (CPU), a microprocessor, an application specific integrated circuit (ASIC), one or more integrated circuits, etc., and is configured to execute a related program to implement the technical solutions provided in the implementations of the present specification.

The memory 1020 can be implemented in a form of a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is called and executed by the processor 1010.

The input/output interface 1030 is configured to connect an input/output module to input and output information. The input/output module can be disposed as a component in the device (not shown in the figure), or can be externally connected to the device to provide a corresponding function. An input device can include a keyboard, a mouse, a touchscreen, a microphone, various sensors, etc. An output device can include a display, a speaker, a vibrator, an indicator, etc.

The communications interface 1040 is configured to connect to a communications module (not shown in the figure) to implement communication and interaction between the device and another device. The communications module can implement communication in a wired manner (for example, a USB or a network cable) or a wireless manner (for example, a mobile network, Wi-Fi, or Bluetooth).

The bus 1050 includes a channel for transmitting information between components (such as the processor 1010, the memory 1020, the input/output interface 1030, and the communications interface 1040) of the device.

It is worthwhile to note that, although only the processor 1010, the memory 1020, the input/output interface 1030, the communications interface 1040, and the bus 1050 are shown for the device, in a specific implementation process, the device can further include other components needed for normal operation. In addition, a person skilled in the art can understand that the device can include only components needed for implementing the solutions in the implementations of the present specification, instead of including all the components shown in the figure.

An implementation of the present specification further provides a computer readable storage medium. A computer program is stored on the computer readable storage medium. When the program is executed by a processor, the method for creating an index in a blockchain-type ledger shown in FIG. 5 is implemented.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette, a cassette magnetic disk storage, or another magnetic storage device or any other non-transmission medium. The computer storage medium can be configured to store information that can be accessed by the computing device. As described in the present application, the computer readable medium does not include computer readable transitory media, such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The systems, methods, modules, or units illustrated in the previous implementations can be implemented by using a computer chip or an entity, or can be implemented by using a product having a certain function. A typical implementation device is a computer. The computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations of the present specification are described in a progressive way. For same or similar parts of the implementations, references can be made to the implementations mutually. Each implementation focuses on a difference from other implementations. Particularly, an apparatus implementation is similar to a method implementation, and therefore is described briefly. For a related part, references can be made to some descriptions in the method implementation. The previously described apparatus implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions in the implementations. A person of ordinary skill in the art can understand and implement the implementations of the present specification without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented method comprising:
    obtaining, by a centralized database server, a service attribute and a sequence number comprised in a data record, wherein the data record is stored in a blockchain-type ledger;
    determining location information of the data record in the blockchain-type ledger, wherein the location information comprises a block height of a data block comprising the data record, and an offset of the data record in the data block;
    establishing a mapping relationship between the service attribute, the location information, and the sequence number;
    based on the sequence number, sequentially writing the mapping relationship to an index that uses the service attribute as a primary key, wherein
    each data block other than an initial data block of the blockchain-type ledger comprises at least one data record and a hash value of the data block itself that is determined based on a hash value of a previous data block and a data record comprised in the data block itself, and wherein block heights of data blocks increase based on a sequence of block forming time;
    receiving a query instruction, from a query instruction sender, wherein the query instruction comprises a specific value of the service attribute;
    performing matching in an index table based on the specific value of the service attribute to determine location information and sequence numbers corresponding to the specific value of the service attribute in the index table; and
    obtaining corresponding data records from the blockchain-type ledger based on the location information, and sequentially returning the obtained corresponding data records to the query instruction sender based on the sequence numbers.

2. The computer-implemented method of claim 1, wherein obtaining a service attribute and a sequence number comprises:
    responsive to receiving a data record sent by a user, obtaining the service attribute and the sequence number comprised in a specified identification filed in the data record; or
    determining a data record comprised in a data block in the blockchain-type ledger, and obtaining the service attribute and the sequence number that are comprised in a specified identification field in any data record comprised in the data block.

3. The computer-implemented method of claim 1, wherein sequentially writing the mapping relationship to an index that uses the service attribute as a primary key comprises:
    creating an index record using the service attribute as a primary key in an index table when the primary key in the index does not comprise the service attribute; or
    writing the location information and the sequence number to an index record comprising the service attribute when the primary key in the index comprises the service attribute.

4. The computer-implemented method of claim 1 further comprising:
    receiving data to be stored, wherein the data to be stored is sent by a user;
        generating a second data record comprising the data to be stored, and determining a hash value of the second data record, wherein the second data record further comprises a second service attribute and a second sequence number; and after a predetermined block forming condition is satisfied, determining one or more data records to be written to a second data block, and generating an Nth data block that comprises a hash value of the second data block and the second data record, corresponding to conditions of N, wherein N indicates the second sequence number of the second data block and the conditions comprise:
  when N is equal to one, giving a hash value and block height of the initial data block based on a predetermined method; or
  when N is greater than one, determining the hash value of the Nth data block based on each data record to be written to the data block and a hash value of an (N−1)th data block, and generating the Nth data block that comprises the hash value of the Nth data block and the data record, wherein the block heights of the data blocks increase monotonically based on the sequence of block forming time.

5. The computer-implemented method of claim 4, wherein the predetermined block forming condition comprises:
  a quantity of data records to be stored reaches a quantity threshold; or
  a time interval from a previous block forming time reaches a time threshold.

6. A non-transitory, computer-readable medium storing one or more instructions executable by a computer system to perform operations comprising:
  obtaining, by a centralized database server, a service attribute and a sequence number comprised in a data record, wherein the data record is stored in a blockchain-type ledger;
  determining location information of the data record in the blockchain-type ledger, wherein the location information comprises a block height of a data block comprising the data record, and an offset of the data record in the data block;
  establishing a mapping relationship between the service attribute, the location information, and the sequence number;
  based on the sequence number, sequentially writing the mapping relationship to an index that uses the service attribute as a primary key, wherein
  each data block other than an initial data block of the blockchain-type ledger comprises at least one data record and a hash value of the data block itself that is determined based on a hash value of a previous data block and a data record comprised in the data block itself, and wherein block heights of data blocks increase based on a sequence of block forming time;
  receiving a query instruction, from a query instruction sender, wherein the query instruction comprises a specific value of the service attribute;
  performing matching in an index table based on the specific value of the service attribute to determine location information and sequence numbers corresponding to the specific value of the service attribute in the index table; and
  obtaining corresponding data records from the blockchain-type ledger based on the location information, and sequentially returning the obtained corresponding data records to the query instruction sender based on the sequence numbers.

7. The non-transitory, computer-readable medium of claim 6, wherein obtaining a service attribute and a sequence number comprises:
  responsive to receiving a data record sent by a user, obtaining the service attribute and the sequence number comprised in a specified identification filed in the data record; or
  determining a data record comprised in a data block in the blockchain-type ledger, and obtaining the service attribute and the sequence number that are comprised in a specified identification field in any data record comprised in the data block.

8. The non-transitory, computer-readable medium of claim 6, wherein sequentially writing the mapping relationship to an index that uses the service attribute as a primary key comprises:
  creating an index record using the service attribute as a primary key in an index table when the primary key in the index does not comprise the service attribute; or
  writing the location information and the sequence number to an index record comprising the service attribute when the primary key in the index comprises the service attribute.

9. The non-transitory, computer-readable medium of claim 6 further comprising: receiving data to be stored, wherein the data to be stored is sent by a user;
  generating a second data record comprising the data to be stored, and determining a hash value of the second data record, wherein the second data record further comprises a second service attribute and a second sequence number; and
  after a predetermined block forming condition is satisfied, determining one or more data records to be written to a second data block, and generating an Nth data block that comprises a hash value of the second data block and the second data record, corresponding to conditions of N, wherein N indicates the second sequence number of the second data block and the conditions comprise:
    when N is equal to one, giving a hash value and block height of the initial data block based on a predetermined method; or
    when N is greater than one, determining the hash value of the Nth data block based on each data record to be written to the data block and a hash value of an (N−1)th data block, and generating the Nth data block that comprises the hash value of the Nth data block and the data record, wherein the block heights of the data blocks increase monotonically based on the sequence of block forming time.

10. The non-transitory, computer-readable medium of claim 9, wherein the predetermined block forming condition comprises:
  a quantity of data records to be stored reaches a quantity threshold; or
  a time interval from a previous block forming time reaches a time threshold.

11. A computer-implemented system, comprising: one or more computers; and
  one or more computer memory devices interoperably coupled with the one or more computers and having tangible, non-transitory, machine-readable media storing one or more instructions that, when executed by the one or more computers, perform one or more operations comprising:

obtaining, by a centralized database server, a service attribute and a sequence number comprised in a data record, wherein the data record is stored in a blockchain-type ledger;

determining location information of the data record in the blockchain-type ledger, wherein the location information comprises a block height of a data block comprising the data record, and an offset of the data record in the data block;

establishing a mapping relationship between the service attribute, the location information, and the sequence number;

based on the sequence number, sequentially writing the mapping relationship to an index that uses the service attribute as a primary key, wherein each data block other than an initial data block of the blockchain-type ledger comprises at least one data record and a hash value of the data block itself that is determined based on a hash value of a previous data block and a data record comprised in the data block itself, and wherein block heights of data blocks increase based on a sequence of block forming time;

receiving a query instruction, from a query instruction sender, wherein the query instruction comprises a specific value of the service attribute;

performing matching in an index table based on the specific value of the service attribute to determine location information and sequence numbers corresponding to the specific value of the service attribute in the index table; and obtaining corresponding data records from the blockchain-type ledger based on the location information, and sequentially returning the obtained corresponding data records to the query instruction sender based on the sequence numbers.

12. The computer-implemented system of claim 11, wherein obtaining a service attribute and a sequence number comprises:

responsive to receiving a data record sent by a user, obtaining the service attribute and the sequence number comprised in a specified identification filed in the data record; or determining a data record comprised in a data block in the blockchain-type ledger, and obtaining the service attribute and the sequence number that are comprised in a specified identification field in any data record comprised in the data block.

13. The computer-implemented system of claim 11, wherein sequentially writing the mapping relationship to an index that uses the service attribute as a primary key comprises:

creating an index record using the service attribute as a primary key in an index table when the primary key in the index does not comprise the service attribute; or writing the location information and the sequence number to an index record comprising the service attribute when the primary key in the index comprises the service attribute.

14. The computer-implemented system of claim 11 further comprising:

receiving data to be stored, wherein the data to be stored is sent by a user;

generating a second data record comprising the data to be stored, and determining a hash value of the second data record, wherein the second data record further comprises a second service attribute and a second sequence number; and after a predetermined block forming condition is satisfied, determining one or more data records to be written to a second data block, and generating an Nth data block that comprises a hash value of the second data block and the second data record, corresponding to conditions of N, wherein N indicates the second sequence number of the second data block and the conditions comprise:

when N is equal to one, giving a hash value and block height of the initial data block based on a predetermined method; or when N is greater than one, determining the hash value of the Nth data block based on each data record to be written to the data block and a hash value of an (N−1)th data block, and generating the Nth data block that comprises the hash value of the Nth data block and the data record, wherein the block heights of the data blocks increase monotonically based on the sequence of block forming time.

15. The computer-implemented system of claim 14, wherein the predetermined block forming condition comprises:

a quantity of data records to be stored reaches a quantity threshold; or a time interval from a previous block forming time reaches a time threshold.

* * * * *